(12) United States Patent
Yows et al.

(10) Patent No.: US 9,917,319 B2
(45) Date of Patent: Mar. 13, 2018

(54) GAS GENERATOR AND PROCESS THEREFOR

(71) Applicant: Aerojet Rocketdyne, Inc., Sacramento, CA (US)

(72) Inventors: Stephen Yows, Moorpark, CA (US); Chandrashekhar Sonwane, Northridge, CA (US)

(73) Assignee: AEROJET ROCKETDYNE, INC., Canoga Park, CA (US)

(*) Notice: Subject to any disclaimer, the term of this patent is extended or adjusted under 35 U.S.C. 154(b) by 188 days.

(21) Appl. No.: 15/142,684

(22) Filed: Apr. 29, 2016

(65) Prior Publication Data

US 2016/0322660 A1 Nov. 3, 2016

Related U.S. Application Data

(60) Provisional application No. 62/156,250, filed on May 2, 2015.

(51) Int. Cl.
| | |
|---|---|
| *H01M 8/06* | (2016.01) |
| *H01M 8/065* | (2016.01) |
| *H01M 8/04082* | (2016.01) |
| *C01B 3/06* | (2006.01) |
| *C01B 3/08* | (2006.01) |

(52) U.S. Cl.
CPC ............ *H01M 8/065* (2013.01); *C01B 3/065* (2013.01); *C01B 3/08* (2013.01); *H01M 8/04208* (2013.01); *H01M 2250/20* (2013.01); *Y02T 90/32* (2013.01)

(58) Field of Classification Search
CPC .................................................... H01M 8/065
See application file for complete search history.

(56) References Cited

U.S. PATENT DOCUMENTS

| | | | | |
|---|---|---|---|---|
| 4,854,942 A | * | 8/1989 | Denney .................... | B01D 3/06 210/634 |
| 5,817,157 A | * | 10/1998 | Checketts .................. | B01J 7/02 422/211 |
| 2005/0048331 A1 | * | 3/2005 | Stephens .................. | B01J 19/10 422/177 |
| 2008/0014481 A1 | * | 1/2008 | Fiebig ................. | H01M 8/0631 48/61 |
| 2008/0202985 A1 | * | 8/2008 | Hatfield .................... | C01B 3/12 208/403 |

\* cited by examiner

*Primary Examiner* — Scott J Chmielecki
(74) *Attorney, Agent, or Firm* — Joel G Landau

(57) ABSTRACT

A process of generating a gas includes providing an encapsulation of reactive metal particles, releasing the reactive metal particles from the encapsulation, mixing the reactive metal particles in turbulent water, reacting the reactive metal particles in the turbulent water to generate hydrogen, cooling the turbulent water and the hydrogen with water jets, separating solids and liquids from the hydrogen, and providing the hydrogen to an electrochemical cell.

27 Claims, 3 Drawing Sheets

GAS GENERATOR AND PROCESS THEREFOR

CROSS-REFERENCE TO RELATED APPLICATION

The present disclosure claims priority to U.S. Provisional Patent Application No. 62/156,250, filed May 2, 2015.

BACKGROUND

Electrochemical cells are known and used for generating electricity. For example, a typical fuel cell utilizes hydrogen and oxygen in an electrochemical reaction to generate electric current. The hydrogen is often supplied from a hydrogen gas storage tank. For extended operation of the fuel cell, one or more relatively large tanks are required.

SUMMARY

A process of generating a gas according to an example of the present disclosure includes providing an encapsulation of reactive metal particles, releasing the reactive metal particles from the encapsulation, mixing the reactive metal particles in turbulent water, reacting the reactive metal particles in the turbulent water to generate hydrogen, cooling the turbulent water and the hydrogen with water jets, separating solids and liquids from the hydrogen, and providing the hydrogen to an electrochemical cell.

In a further embodiment of any of the foregoing embodiments, the encapsulation includes a shell containing the reactive metal particles, and the shell is non-reactive with respect to the water.

In a further embodiment of any of the foregoing embodiments, the shell is ceramic.

In a further embodiment of any of the foregoing embodiments, the shell is polymeric.

In a further embodiment of any of the foregoing embodiments, each of the reactive metal particles include a coating.

In a further embodiment of any of the foregoing embodiments, the encapsulation includes a shell containing the reactive metal particles, and the shell is soluble in the water.

In a further embodiment of any of the foregoing embodiments, the providing includes injecting the encapsulation into a chamber.

In a further embodiment of any of the foregoing embodiments, the releasing includes fracturing of the encapsulation.

In a further embodiment of any of the foregoing embodiments, the fracturing of the encapsulation is by accelerating the encapsulation into a strike surface.

In a further embodiment of any of the foregoing embodiments, the mixing of the reactive metal particles includes injecting water toward the strike surface.

In a further embodiment of any of the foregoing embodiments, the cooling of the turbulent water and the hydrogen includes injecting the water jets downstream from the strike surface.

A further embodiment of any of the foregoing embodiments includes serially providing additional encapsulations.

A further embodiment of any of the foregoing embodiments includes serially providing the additional encapsulations at a rate that is responsive to electrical output of the electrochemical cell.

A further embodiment of any of the foregoing embodiments includes dispensing the encapsulations from a cartridge into a chamber for the releasing.

In a further embodiment of any of the foregoing embodiments, the reactive metal particles are nanoparticles.

In a further embodiment of any of the foregoing embodiments, the reactive metal particles are selected from the group consisting of aluminum, magnesium, sodium, and combinations thereof.

A gas generator according to an example of the present disclosure includes a chamber, a reaction zone in the chamber, a ram operable to accelerate a frangible reactant material into the reaction zone in the chamber, and at least one liquid injector directed toward the reaction zone.

In a further embodiment of any of the foregoing embodiments, the reaction zone includes a strike surface.

In a further embodiment of any of the foregoing embodiments, the strike surface includes a wedge.

In a further embodiment of any of the foregoing embodiments, the ram includes an injection tube and a plunger moveable in the injection tube.

In a further embodiment of any of the foregoing embodiments, at least one liquid injector includes a water injector.

A further embodiment of any of the foregoing embodiments includes at least one coolant injector located downstream of the reaction zone.

A further embodiment of any of the foregoing embodiments includes a cartridge attachable with the chamber and operable to dispense the frangible reactant material to the ram.

An electric generator system according to an example of the present disclosure includes a gas generator that has a chamber, a reaction zone in the chamber, a ram operable to accelerate a frangible reactant material into the reaction zone in the chamber, at least one liquid injector directed toward the reaction zone, a purifier located downstream of the gas generator, and at least one electrochemical cell located downstream of the purifier.

In a further embodiment of any of the foregoing embodiments, the reaction zone includes a strike surface.

In a further embodiment of any of the foregoing embodiments, the ram includes an injection tube and a plunger moveable in the injection tube.

A further embodiment of any of the foregoing embodiments includes a cartridge attachable with the chamber and operable to dispense the frangible reactant material to the ram.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
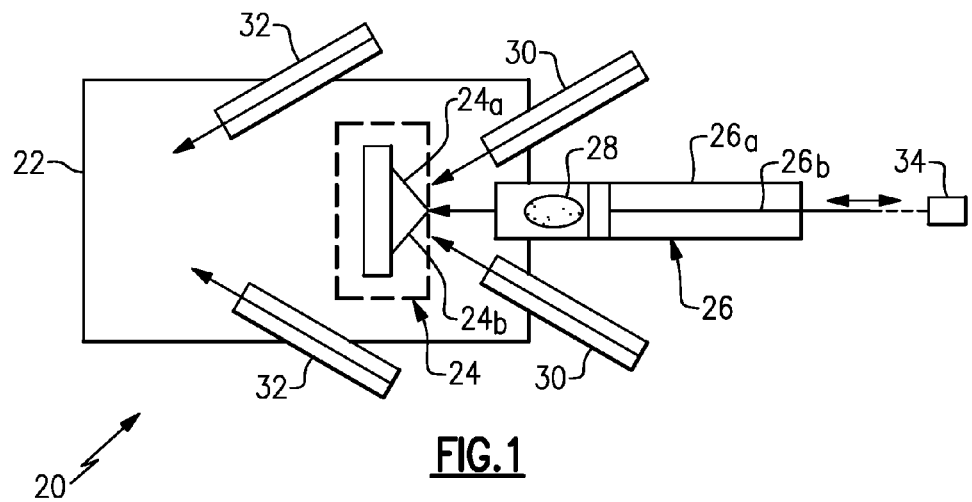
FIG. 1 illustrates an example of a gas generator.

FIG. 1 schematically illustrates a gas generator 20 that can be used in underwater vehicles, portable power supply units, and the like. The gas generator 20 may be described with respect to the generation of hydrogen gas for electrochemical cells or the like. As will be appreciated however, the examples herein are not limited to generation of hydrogen and other gas systems may also benefit.

The gas generator 20 includes a chamber 22 and a reaction zone 24 in the chamber 22. For instance, the reaction zone 24 is the region on the chamber 22 where reactants mix and react, although some mixing and reacting may also proceed outside the reaction zone 24. A ram 26 is operable to accelerate a frangible reactant material 28 into the reaction zone 24 in the chamber 22. One or more liquid injectors 30 (two shown) are directed toward the reaction zone 24. In this example, the gas generator 20 also includes one or more coolant injectors 32 (two shown) located downstream of the reaction zone 24.

Although not limited, the ram 26 in the illustrated example includes a tube 26a and a plunger 26b that is moveable in the tube 26a. For example, an actuator 34 may be coupled with the plunger 26b to move the plunger 26b back and forth in the tube 26a. The actuator 34 may be a motor or drive that can be controlled to continuously operate the plunger 26b for automated operation. Alternatively or additionally, the actuator 34 may be manual for small scale use or testing.

In one example for generating hydrogen gas, the chamber 22 contains a hydrogen gas generation reaction between reactive metal and water. For instance, the frangible reactant material 28 is an encapsulation that has a frangible shell and high surface area reactive metal particles contained within the shell. The term "frangible" as used herein refers to a structure, such as the shell, that is readily fractured or broken-up under the conditions in the gas generator 20. Such fracturing or breaking-up may refer to fracturing by cracking, breaking-up by cracking, breaking-up by melting, or combinations thereof.

The metal of the reactive metal particles is a metal or metals that is/are reactive with water. As examples, the reactive metal particles are aluminum particles, magnesium particles, sodium particles, or mixtures thereof. In further examples, the particles are nanoparticles, but may alternatively be picoparticles or microparticles. In one example, the encapsulation contains about 100 nanoparticles of the reactive metal and the encapsulation is spherical in order to promote uniform fracture or breakup to reduce "hot spots."

Example shells may be formed of a material that is non-reactive with water, such as a ceramic shell or a polymer shell. Alternatively, the shell may be readily soluble in water but should then be kept in a dry and inert environment. The shell protects the reactive metal particles from oxidation and facilitates handling of the reactive metal particles for loading into the gas generator 20. For further protection of the reactive metal particles from oxidation and/or to reduce the risk that the particles react with each other or agglomerate, the particles in the shell may also have a protective polymer coating. For example, the protective polymer coating may also be readily soluble in water. If a water soluble coating is used, any gas in the encapsulation should be dry and inert. For instance, the void space in the encapsulation is moisture-free and may substantially be hydrogen gas, argon gas, or other cover gas that is non-reactive with the reactive metal.

The ram 26 accelerates the encapsulation into the chamber 22. In the illustrated example, the reaction zone 24 includes a strike surface 24a against which the encapsulation is accelerated such that the shell of the encapsulation fractures. In this regard, the strike surface 24a can be adapted to facilitate fracture. In one example, the strike surface 24a includes a wedge 24b that has an apex. The ram 26 accelerates the encapsulation against the apex to facilitate fracture. The fracture of the shell releases the reactive metal particles.

In modified examples, the gas generator 20 may exclude the strike surface 24a. For instance, rather than impact with the strike surface 24a, water from the liquid injectors 30 is used to kinetically fracture and/or dissolve the encapsulation. Additionally or alternatively, a separate energy source may be used to release the reactive metal particles from the encapsulation, such as but not limited to, pressure waves (e.g., sonic waves to fracture the shell and release the particles), thermal radiation (melting the shell to release the particles), or laser (melting and/or fracturing the shell to release the particles).

Water is injected at a high rate from the one or more liquid injectors 30 toward the reaction zone 24. For example, the water may be pure or recycled water that has been subjected to filtering or other purification to remove solids. The impingement of the water onto the strike surface 24a causes turbulence and mixing of the water and the reactive metal particles. The turbulence and mixing promote exposure between the reactive metal particles and the water for full or substantially full reaction of the reactive metal and water. The reactive metal and water exothermically react to produce hydrogen gas and metal hydroxide precipitate. The metal hydroxide, hydrogen, and remnants of the shell are then discharged from the gas generator. The chamber 22 may operate at atmospheric pressure or higher pressure, depending upon hydrogen output. In this regard, a back pressure regulating valve may be used to control pressure in the chamber 22.

The angle of the liquid injectors 30 and rate of water injection can be adjusted for a given system to enhance turbulence and mixing and/or to enhance kinetic fracture or dissolution of a soluble coating or shell. For example, the angle of the liquid injectors 30 and sizes of the liquid injectors 30 may be established using a modified Elverum-Morey (EM) equation, which is used in rocketry to establish mixing in rocket engines. The EM equation enhances turbulence for a given encapsulation size by providing a predetermined area of water injectors.

In this example, the exothermic reaction of the reactive metal and the water generates heat that may raise the temperature of the byproducts. The one or more coolant injectors 32 can be included downstream from the reaction zone 24 to inject relatively cool water into the chamber 22 to reduce the temperature of the byproducts. Generally, the amount of heat produced depends on the amount of water injected versus the amount of the reactive metal. Any excess injected water that does not react serves to dissipate the heat and facilitate the avoidance of producing steam. In this regard, the amount of reactive metal and water may be regulated for the given output of hydrogen such that the bulk water temperature does rise more than a few degrees Fahrenheit.

The gas generator 20 can be used in place of or in addition to hydrogen gas storage tanks. In this regard, the gas generator 20 is relatively compact in comparison to storage tanks and thus provides a compact hydrogen gas source. Additionally, the encapsulations used with the gas generator 20 are safe to handle, and the containment of the reaction in the chamber 22 along with the use of the reactive metal particles provide a stable reaction system at relatively low temperature and pressure.

Figure 2:
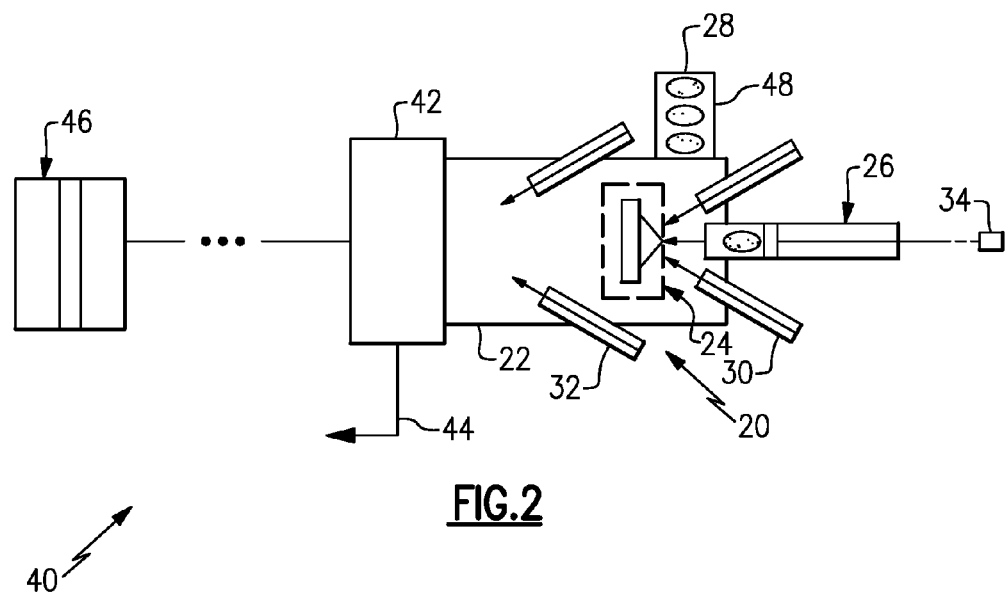
FIG. 2 illustrates a gas generator in an electric generator system.

FIG. 2 illustrates an example of the gas generator 20 in an electric generator system 40. In this example, the system 40 includes a purifier 42 located downstream of the gas generator 20. The purifier 42 is operable to separate the hydrogen gas from liquids (e.g., water) and solids (e.g., remnants of the shell and metal hydroxide), which are discharged as a waste or solids stream 44. For example, the purifier 42 may be a cyclonic separator, a degasifier, a filter, a packed bed, or combinations thereof to remove shell remnants, hydrogen hydroxide, liquid moisture, gaseous moisture, and other impurities from the hydrogen gas. The hydrogen gas is then provided to one or more electrochemical cells 46 located downstream of the purifier 42 and the gas generator 20. For example, the electrochemical cells are fuel cells that utilize the hydrogen as a fuel, along with air/oxygen, to generate electricity.

In the illustrated example, the gas generator 20 also includes a cartridge 48 that is attachable with the chamber 22. The cartridge 48 contains multiple encapsulations and is operable to serially dispense the encapsulations to the ram 26 for continuous delivery of encapsulations into the chamber 22 and continuous hydrogen gas generation.

Figure 3:
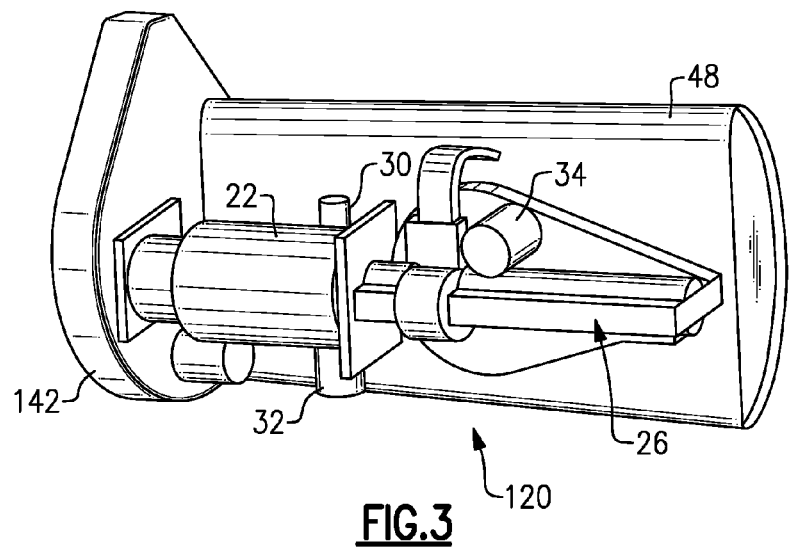
FIG. 3 illustrates another example of a gas generator, with an integral purifier and a pellet delivery cartridge.
Figure 4:
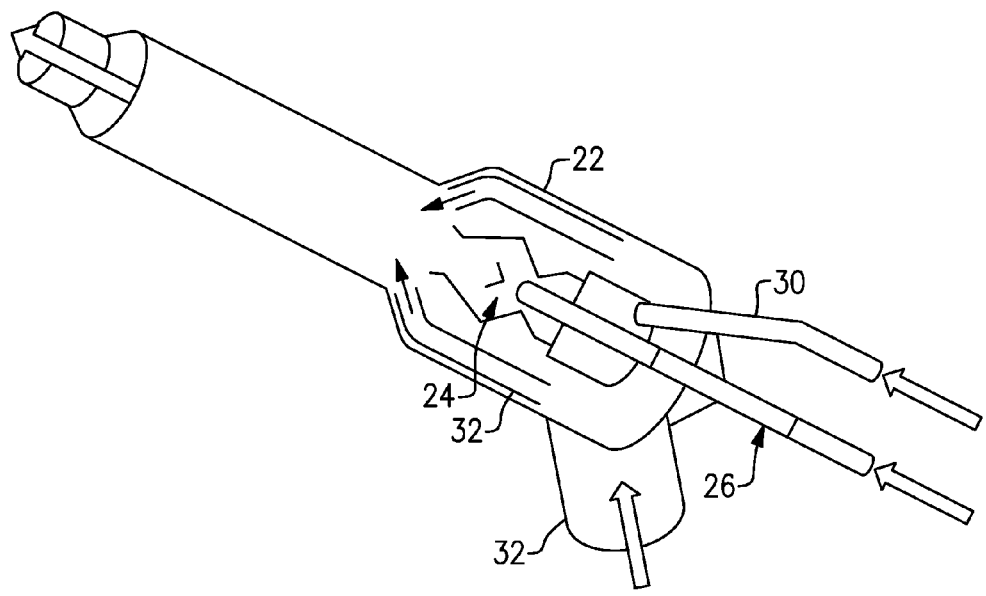
FIG. 4 illustrates a sectioned view of the gas generator of FIG. 3.

FIG. 3 shows a model of another example of a gas generator 120 with an integral purifier 142. Additional purifiers may also be used downstream. FIG. 4 shows a sectioned view of just the gas generator 120. In this disclosure, like reference numerals designate like elements where appropriate and reference numerals with the addition of one-hundred or multiples thereof designate modified elements that are understood to incorporate the same features and benefits of the corresponding elements. In this example, the cartridge 48 is relatively large and can continuously deliver encapsulations into the ram 26 for continuous hydrogen gas generation. As can be appreciated, the rate of delivery of the encapsulations can be controlled responsive to the amount of hydrogen desired and, by extension, responsive to electrical output of the electrochemical cells 46. For example, for greater hydrogen output and greater electrical output, the encapsulations are delivered at a higher rate. Inversely, for lower hydrogen output and lower electrical output, the encapsulations are delivered at a lower rate.

Figure 5:
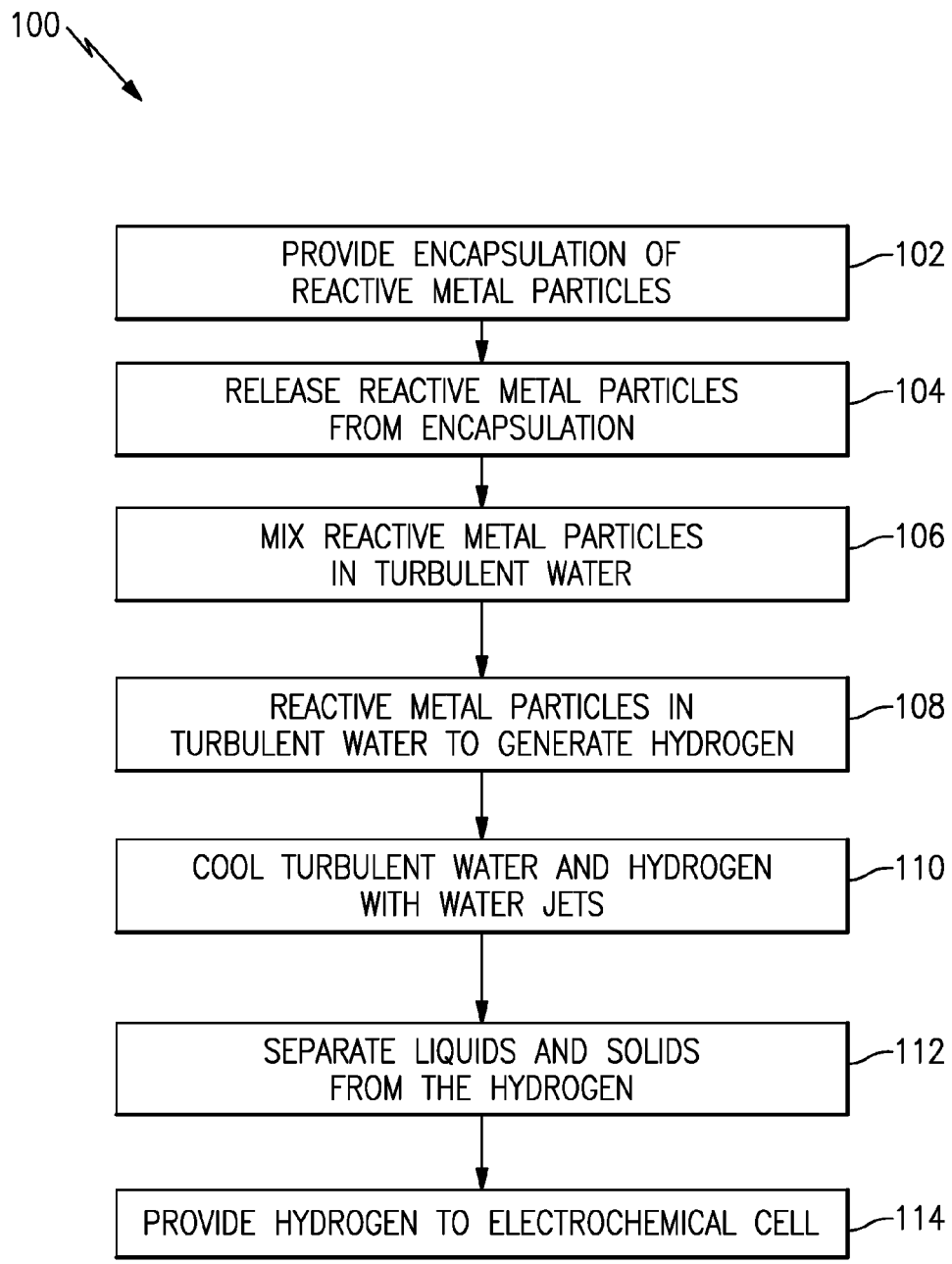
FIG. 5 illustrates an example method for generating a gas.

FIG. 5 illustrates an example process 100 of generating a gas. For instance, the process 100 may be conducted using the gas generator 20/120 and system 40, the descriptions of which are incorporated as further examples of the process 100. The reactive metal particles in the encapsulation are provided at 102. For example, the provision of the encapsulation may include dispensing of the encapsulation into the ram 26. At 104 the reactive metal particles are released from the encapsulation. For instance, the release includes fracturing the encapsulation with water, fracturing the encapsulation by accelerating the encapsulation against the strike surface 24a, and/or melting or dissolving the shell of the encapsulation. At 106 the reactive metal particles are mixed in turbulent water. For example, the mixing includes injecting the water at a relatively high rate through the liquid injectors 30. At 108 the reactive metal particles react in the turbulent water to generate hydrogen, and at 110 the turbulent water and the hydrogen are cooled with water jets via the coolant injectors 32. At 112 liquids and solids are separated from the hydrogen, such as to remove water and remnants of the shell of the encapsulation, remove other solids, and remove moisture. At 114 the purified hydrogen gas is provided to the electrochemical cell 46 to generate electric current.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A process of generating a gas, the process comprising:
providing an encapsulation of reactive metal particles;
releasing the reactive metal particles from the encapsulation;
mixing the reactive metal particles in turbulent water;
reacting the reactive metal particles in the turbulent water to generate hydrogen;
cooling the turbulent water and the hydrogen with water jets;
separating solids and liquids from the hydrogen; and
providing the hydrogen to an electrochemical cell.

2. The process as recited in claim 1, wherein the encapsulation includes a shell containing the reactive metal particles, and the shell is non-reactive with respect to the water.

3. The process as recited in claim 2, wherein the shell is ceramic.

4. The process as recited in claim 2, wherein the shell is polymeric.

5. The process as recited in claim 2, wherein each of the reactive metal particles include a coating.

6. The process as recited in claim 1, wherein the encapsulation includes a shell containing the reactive metal particles, and the shell is soluble in the water.

7. The process as recited in claim 1, wherein the providing includes injecting the encapsulation into a chamber.

8. The process as recited in claim 1, wherein the releasing includes fracturing of the encapsulation.

9. The process as recited in claim 8, wherein the fracturing of the encapsulation is by accelerating the encapsulation into a strike surface.

10. The process as recited in claim 9, wherein the mixing of the reactive metal particles includes injecting water toward the strike surface.

11. The process as recited in claim 10, wherein the cooling of the turbulent water and the hydrogen includes injecting the water jets downstream from the strike surface.

12. The process as recited in claim 1, further comprising serially providing additional encapsulations.

13. The process as recited in claim 12, further comprising serially providing the additional encapsulations at a rate that is responsive to electrical output of the electrochemical cell.

14. The process as recited in claim 12, further comprising dispensing the encapsulations from a cartridge into a chamber for the releasing.

15. The process as recited in claim 1, wherein the reactive metal particles are nanoparticles.

16. The process as recited in claim 1, wherein the reactive metal particles are selected from the group consisting of aluminum, magnesium, sodium, and combinations thereof.

17. A gas generator comprising:
a chamber;
a reaction zone in the chamber;
a ram operable to accelerate a frangible reactant material into the reaction zone in the chamber; and at least one liquid injector directed toward the reaction zone and configured to provide turbulent water to the reaction zone.

18. The gas generator as recited in claim 17, wherein the reaction zone includes a strike surface.

19. The gas generator as recited in claim 18, wherein the strike surface includes a wedge.

20. The gas generator as recited in claim 17, wherein the ram includes an injection tube and a plunger moveable in the injection tube.

21. The gas generator as recited in claim 17, wherein the at least one liquid injector includes a water injector.

22. The gas generator as recited in claim 17, further comprising at least one coolant injector located downstream of the reaction zone.

23. The gas generator as recited in claim 17, further comprising a cartridge attachable with the chamber and operable to dispense the frangible reactant material to the ram.

24. An electric generator system comprising:
a gas generator including:
   a chamber,
   a reaction zone in the chamber,
   a ram operable to accelerate a frangible reactant material into the reaction zone in the chamber, and
   at least one liquid injector directed toward the reaction zone and configured to provide turbulent water to the reaction zone;
a purifier located downstream of the gas generator; and
at least one electrochemical cell located downstream of the purifier.

25. The electric generator system as recited in claim 24, wherein the reaction zone includes a strike surface.

26. The electric generator system as recited in claim 24, wherein the ram includes an injection tube and a plunger moveable in the injection tube.

27. The electric generator system as recited in claim 24, further comprising a cartridge attachable with the chamber and operable to dispense the frangible reactant material to the ram.

* * * * *